United States Patent
Laakso et al.

[11] Patent Number: 5,898,740
[45] Date of Patent: Apr. 27, 1999

[54] POWER CONTROL METHOD IN A CELLULAR COMMUNICATION SYSTEM, AND A RECEIVER

[75] Inventors: Timo Laakso; Hannu Hakkinen, both of Espoo, Finland

[73] Assignee: Nokia Telecommunications OY, Espoo, Finland

[21] Appl. No.: 08/793,259

[22] PCT Filed: Aug. 23, 1995

[86] PCT No.: PCT/FI95/00450

§ 371 Date: Feb. 21, 1997

§ 102(e) Date: Feb. 21, 1997

[87] PCT Pub. No.: WO96/07246

PCT Pub. Date: Mar. 7, 1996

[30] Foreign Application Priority Data

Aug. 24, 1994 [FI] Finland ................................ 943889

[51] Int. Cl.⁶ .................................................. H04B 1/10
[52] U.S. Cl. ........................ 375/346; 375/349; 455/522; 455/69; 455/574; 370/318
[58] Field of Search .................... 375/200, 206, 375/219, 221, 285, 343, 346, 349; 455/67.1, 69, 422, 127, 13.4, 38.3, 522, 574, 92, 226.1, 226.2; 370/320, 342, 318, 319

[56] References Cited

U.S. PATENT DOCUMENTS

| | | |
|---|---|---|
| 4,470,138 | 9/1984 | Gutleber . |
| 5,218,619 | 6/1993 | Dent . |
| 5,224,120 | 6/1993 | Schilling . |
| 5,363,403 | 11/1994 | Schilling . |
| 5,553,062 | 9/1996 | Schilling et al. ................. 370/479 |
| 5,574,982 | 11/1996 | Almgren et al. ................. 455/69 |

FOREIGN PATENT DOCUMENTS 0 565 505   10/1993   European Pat. Off. .

Primary Examiner—Stephen Chin
Assistant Examiner—Amanda Le
Attorney, Agent, or Firm—Pillsbury Madison & Sutro LLP

[57] ABSTRACT

In a method for controlling transmission power in a cellular communication system which utilizes a technique for canceling multiple access interference, and in which a receiver controls the transmission power of a transmitter on the basis of a received signal, power control is carried out on the received signal after the received signal has been subjected to interference cancellation.

11 Claims, 3 Drawing Sheets

POWER CONTROL METHOD IN A CELLULAR COMMUNICATION SYSTEM, AND A RECEIVER

This s application is the national phase of international application PCT/ F195 /00450 filed Aug. 23, 1995.

BACKGROUND OF THE INVENTION

The invention relates to a method for controlling transmission power in a cellular communication system in which some method for cancelling multiple access interference is utilized and in which a receiver controls the transmission power of a transmitter on the basis of a received signal.

When data transmission systems are designed and implemented, it is endeavored to maximize the number of simultaneous users on an available frequency band without compromising the quality of the transmission. An essential problem is simultaneous transmission and reception of the signals of several simultaneous users, so that the signals cause as little interference to each other as possible. Owing to this fact and the available transmission capacity, several different transmission protocols and multiple access methods have been developed, the most common of which in particular in mobile communication are the FDMA and the TDMA methods, and lately also the CDMA method. The present invention is suited for use in particular in CDMA cellular communication systems.

CDMA is a multiple access method, which is based on the spread spectrum technique, and which has been applied recently in cellular communication systems, in addition to the prior FDMA and TDMA methods. CDMA has several advantages over the prior methods, such as the simplicity of frequency planning and spectral efficiency, which results in a large capacity, i.e. the number of simultaneous users on a given frequency band.

In CDMA, the narrow-band data signal of the user is multiplied to a relatively wide band by means of a spreading code having a remarkably broader band than the data signal. Bandwidths used in known test systems are e.g. 1.25 MHz, 10 MHz and. 25 MHz. In connection with the multiplication, the data signal spreads onto the whole of the band used. All users transmit simultaneously by using the same frequency band. An individual spreading code is used on each connection between the base station and the mobile station, and the signals of the users may be distinguished from each other in the receivers on the basis of the spreading code of each user. An attempt is made for choosing the spreading codes so that they are mutually orthogonal, i.e. they do not correlate with each other.

Correlators or adapted filters in CDMA receivers implemented in a conventional way are synchronized with the desired signal, which is identified on the basis of the spreading code. The data signal is returned in the receiver onto the original band by multiplying it by the same spreading code as in the transmission phase. The signals which have been multiplied by some other spreading code neither correlate nor return to the narrow band in an ideal case. They thus appear as noise from the point of view of the desired signal. The aim is thus to detect the signal of the desired user among several interfering signals. In practice, the spreading codes are not completely non-correlated, and the signals of other users complicate the detection of the desired signal by distorting the received signal. This interference caused by the users for each other is termed as multiple access interference.

The mutual interference caused by simultaneous users for each other described above is the decisive factor for the capacity of the CDMA cellular communication system. The interference may be reduced e.g. by attempting to keep the transmission power levels of the mobile stations as low as possible by means of accurate power control. The power control may be based on some parameter measured or calculated from a received transmission, such as the received power, the signal-to-noise ratio or other quality parameter.

It is advantageous from the point of view of the capacity of the CDMA system if the base station receives the signal from all mobile stations with the same power. However, accurate and fast power control has been difficult to implement, and active reception methods based on interference cancellation thus have also been developed for reducing the interference. Such methods include, for example, interference cancellation methods (IC) and the multiuser detection (MUD). From the point of view of the present invention, the above mentioned reception methods are equal, and in the following they will be generally termed as interference cancellation methods.

In the solutions disclosed above, power control and interference cancellation are discussed as separate solutions. Conventional power control does not take into account the interference cancellation methods which are possibly used in the system, and which also improve the quality of the signal in the receiver, and conventional power control has thus resulted in an under-optimal result, in which case the available capacity has not been successfully utilized in the best possible way.

SUMMARY OF THE INVENTION

The object of the present invention is thus to implement a power control method which takes into account the effect of the interference cancellation on the received signal, and thus leads to a better result than heretofore provided from the point of view of the capacity of the system.

This is achieved with a method of the type set forth in the foregoing BACKGROUND section, which is characterized in that power control is carried out on the basis of the received signal processed with the interference cancellation method.

The invention further relates to a receiver in a cellular communication system, comprising means for reducing multiple access interference, and means for controlling the transmission power of the transmitter on the basis of the received signal. The receiver of the invention is characterized in that means for measuring the parameters required for power control from the received signal are connected after the interference cancellation means.

In the method of the invention, the measurement of the parameters that have an effect on power control is carried out from the signal from which interferences have been reduced with an appropriate interference cancellation method. Thus, a better result can be achieved in interference cancellation, which results in a larger capacity of the system.

The power control of the invention does not set any limits to the interference cancellation method used or the selection of the interference signals to be eliminated.

In a second embodiment of the invention, the measurement of the parameters is carried out both before and after the interference cancellation. Then the preceding measurement provides a rapid response, which does not depend on the delay of the interference cancellation. The latter measurement provides a final, accurate measurement result, which results in the desired quality of the user's signal.

BRIEF DESCRIPTION OF THE INVENTION

In the following, the invention will be described in greater detail with reference to the examples in the attached drawings, in which FIG. 1 shows a cellular communication system in which the method of the invention may be applied, FIG. 2 is a block diagram illustration of the structure of the receiver in accordance with a preferred embodiment of the invention, FIG. 3 shows a more detailed illustration of a possible structure of the receiver of the invention, FIG. 4 illustrates an example of a second possible structure of the receiver of the invention, and FIG. 5 is a block diagram showing the principle of the structure of the second embodiment of the invention.

DETAILED DESCRIPTION

Figure 1:
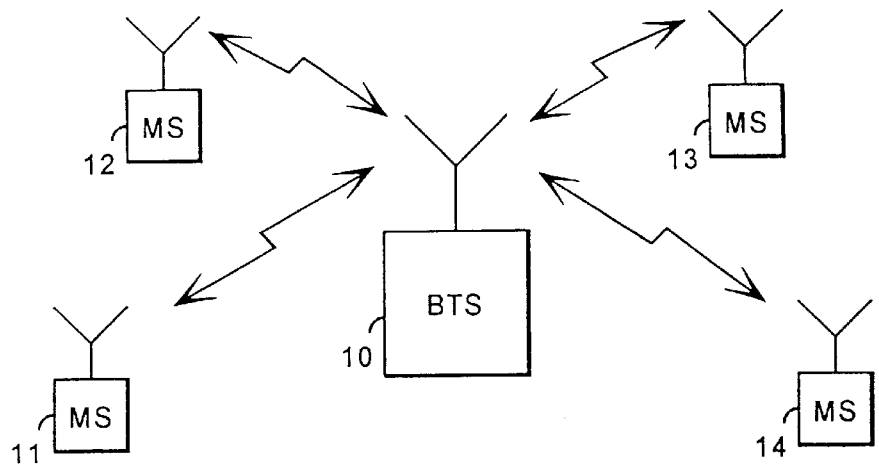

FIG. 1 illustrates a part of the cellular communication system in which the method of the invention may be applied. Each cell of a cellular radio network comprises at least one base station 10 communicating with the subscriber terminal equipments 11–14 within its area. All terminal equipments transmit on the same frequency to the base station 10, which distinguishes the transmissions of different terminal equipments from each other on the basis of the spreading code used by each respective terminal equipment. As it has been described above, the signals of the terminal equipments interfere with each other. In the receiver, the power level perceived at the reception of each signal is measured. The results of this power measurement may be utilized for power control. On the basis of the power measurement, it is also possible to calculate other parameters to be utilized for power control and for other purposes, as well.

It is also possible that the base station of FIG. 1 has other frequency bands available to be used for communication with other terminal equipments located within its area. However, these terminal equipments on different frequencies do not interfere with each other, and within both frequencies, the operation of the cell may be assumed to be independent from the point of view of the invention.

Let us assume that in the cellular communication system of FIG. 1 some interference cancellation system is used for reducing multiple access interference. The method of the invention is suited to be used in connection with any known interference cancellation method or power control algorithm. The basic idea of the invention is to take into account the improvement caused by the interference cancellation method used in the system in the received signal prior to calculating and measuring the parameters that have an effect on power control. A power control command is calculated on the basis of the measured parameters, and the command is transmitted to the transmitter by means of known methods. As the measurement of the parameters is carried out after the interference cancellation, the power levels of different signals settle so that a desired quality of the signal is obtained for each user. The aim is generally to balance the final signal-to-interference ratio before the bit decision is made. The balancing leads to the same average bit-error rate for all users.

Filtering, such as averaging of successive parameters may also be connected with the measurement of the parameters, and the purpose of such filtering is to equalize the statistical variation of the estimates, and the prediction with the aid of which it is endeavored to follow and forecast the changes in the received signal.

The method of the invention may be applied, e.g., in connection with the successive interference cancellation. In the successive interference cancellation, the receiver processes the received transmission so that the signals are demodulated in a certain order, typically in order of magnitude, regenerated and reduced from the received transmission, whereafter the following signal is processed in the same way until all the signals have been processed. In the method of the invention, instead of estimating the power of each user from the total signal in which all interferences are included, the power control and the measurement of parameters connected therewith are carried out on the basis of the purged signal, from which the signals stronger than those of the current user have been reduced.

The invention is also suited to be used in connection with so-called multi-stage interference cancellation in which all the users to be received are processed in parallel, and the bit estimates are adjusted iteratively by repeating the reception procedure after the interference estimates have been reduced. Similarly, the estimates of the necessary power control parameters may be adjusted iteratively for obtaining as reliable power control as possible.

Figure 2:
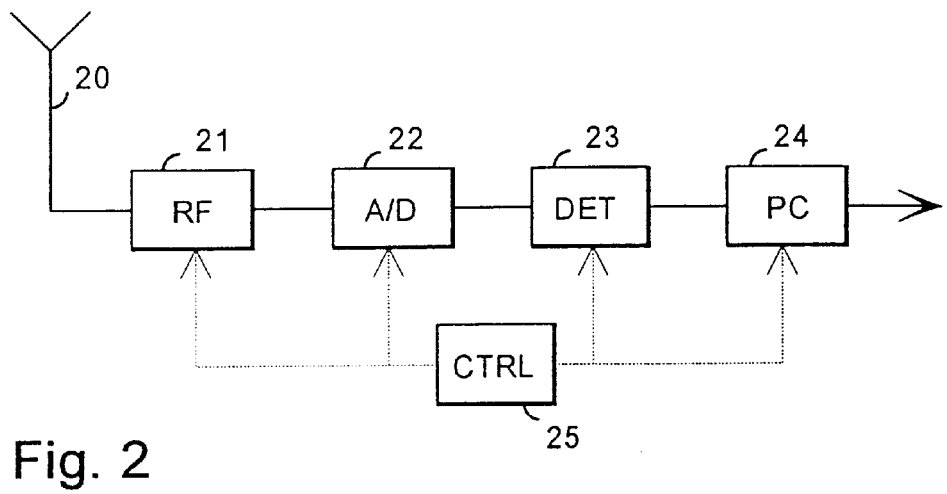

FIG. 2 illustrates a block diagram of the structure of the preferred embodiment of the invention. The receiver of the invention comprises an antenna 20, by means of which the received signal is applied to radio frequency elements 21. From the radio frequency elements, the signal is applied via an A/D converter 22 to means 23, where the interference cancellation and detection of the received signal are carried out. The receiver further comprises means 24, which carry out the measurement of power control parameters from the received signal, and which are connected after the interference cancellation and detection means 23. The signal received from means 24 is further applied to other elements of the receiver. The receiver further comprises control means 25, which control the operation of the elements mentioned above and calculate the actual power control commands on the basis of the parameters obtained from the measurement means.

Figure 3:
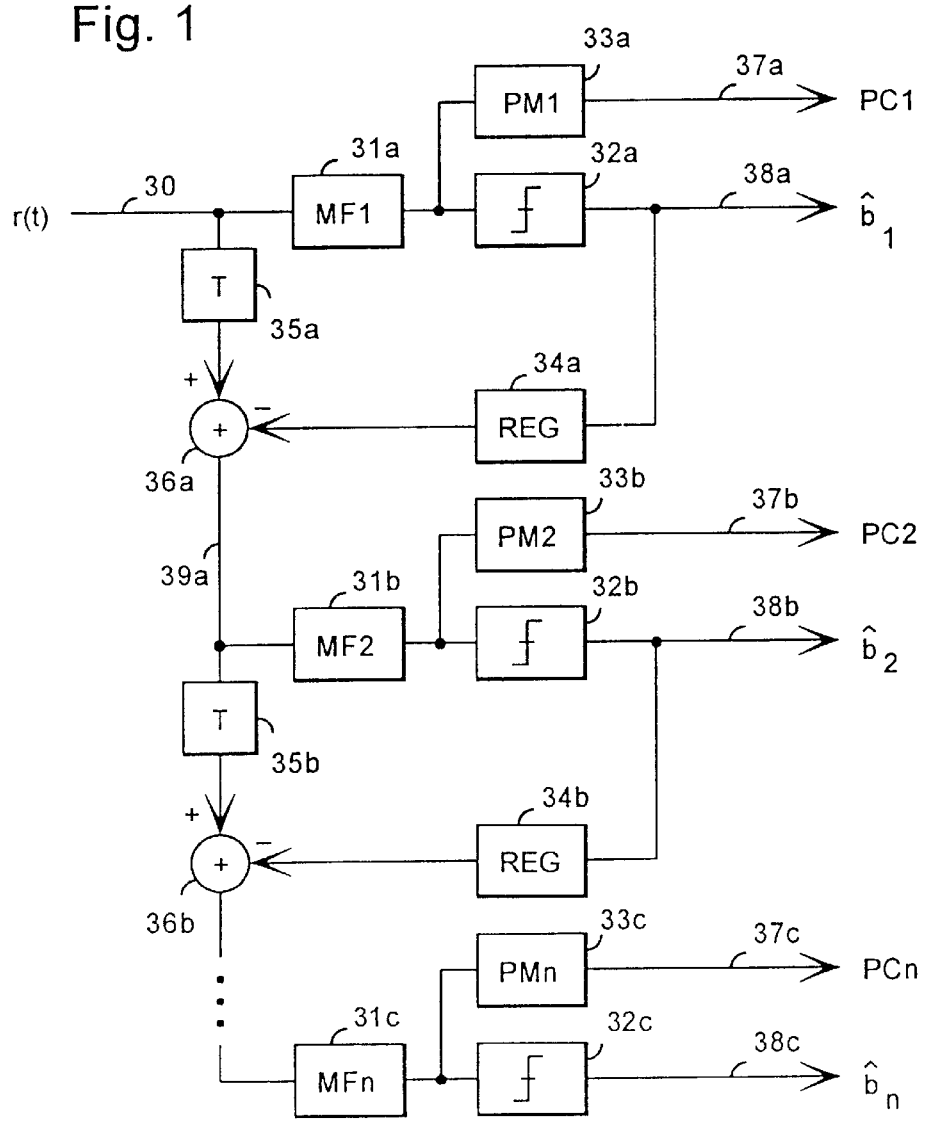

FIG. 3 illustrates the structure of the receiver of the invention in closer detail as to the essential parts of the invention, in a case in which the successive interference cancellation is employed in the system. The blocks shown in FIG. 3 correspond to blocks 23 and 24 in FIG. 2. As it has been described above, in the successive interference cancellation, the received transmission is processed in the receiver, so that the signals are demodulated in a certain order, typically in order of magnitude, regenerated and reduced from the received transmission, whereafter the following signal is processed in the same way, until all signals have been processed.

The receiver in accordance with FIG. 3 comprises a plurality of adapted filters or RAKE receivers $31a$–$31c$, which are each adapted to receive and demodulate the signal of one user, which signals may be distinguished from each other on the basis of the spreading code. The signals are typically demodulated in order of magnitude, whereby the interfering effect of the strongest signals may be eliminated prior to processing the weaker signals.

The received transmission 30 is applied to a first adapted filter $31a$, where the desired signal is demodulated, and further to a first detector $32a$, where the bit decision is made. Signal $38a$ obtained from detector $32a$, thus comprising the estimate of the transmission of the first user, is further applied to other elements of the receiver. In accordance with the successive interference cancellation method, the signal obtained from the first detector $32a$ is also applied to a first regeneration means $34a$, where the detected signal is regenerated again, i.e. re-multiplied by the spreading code. The obtained regenerated signal is further applied to a first summing means 36a, where it is reduced from the received transmission 30, which has been applied to summing means 36a via a first delay means 35a. The signal located at the output of the first adapted filter 31a is applied, in addition to the first detector 32a, to a first measurement means 33a, which carries out from the signal the measurement of the parameters required for power control. A typical measurement parameter is, e.g., the received power contained by the signal. The obtained measurement results 37a are applied to further processing.

A signal 39a obtained from the first summing means 36a thus comprises the received transmission, from which the effect of the signal demodulated by the first adapted filter 31a, i.e. typically the effect of the strongest signal has been eliminated. The signal 39a is applied to a second adapted filter 31b and a second detector 32b, the output of which provides the bit decision 38b of the signal of the second user. The signal 38b of the second user is correspondingly applied to a second regeneration means 34b, wregener is regenerated and applied to a second summing means 36b, where it is reduced from the transmission 39a, which has been applied to the summing means via a second delay means 35b. The signal at the output of the second adapted filter 31b is applied, in addition to the second detector 32b, to a second measurement means 33b, which carries out from the signal the measurement of the parameters required for power control. In the receiver of the invention, the measurement results correspond better to a real situation, since the interfering effect of the stronger signals has been eliminated from the signal from which the measurement is carried out. The obtained measurement results 37b are applied to further processing.

The corresponding operations are performed to all received signals until the last user, whose signal is demodulated by means of an adapted filter 31c and a detector means 32c. From the output signal of the adapted filter 31c, the measurement of the power control parameter of the last user is carried out in measurement means 33c. The signal 38c of the last user does not need to be regenerated as it does not have to be reduced from the received signal, since all users have already been detected.

Figure 4:
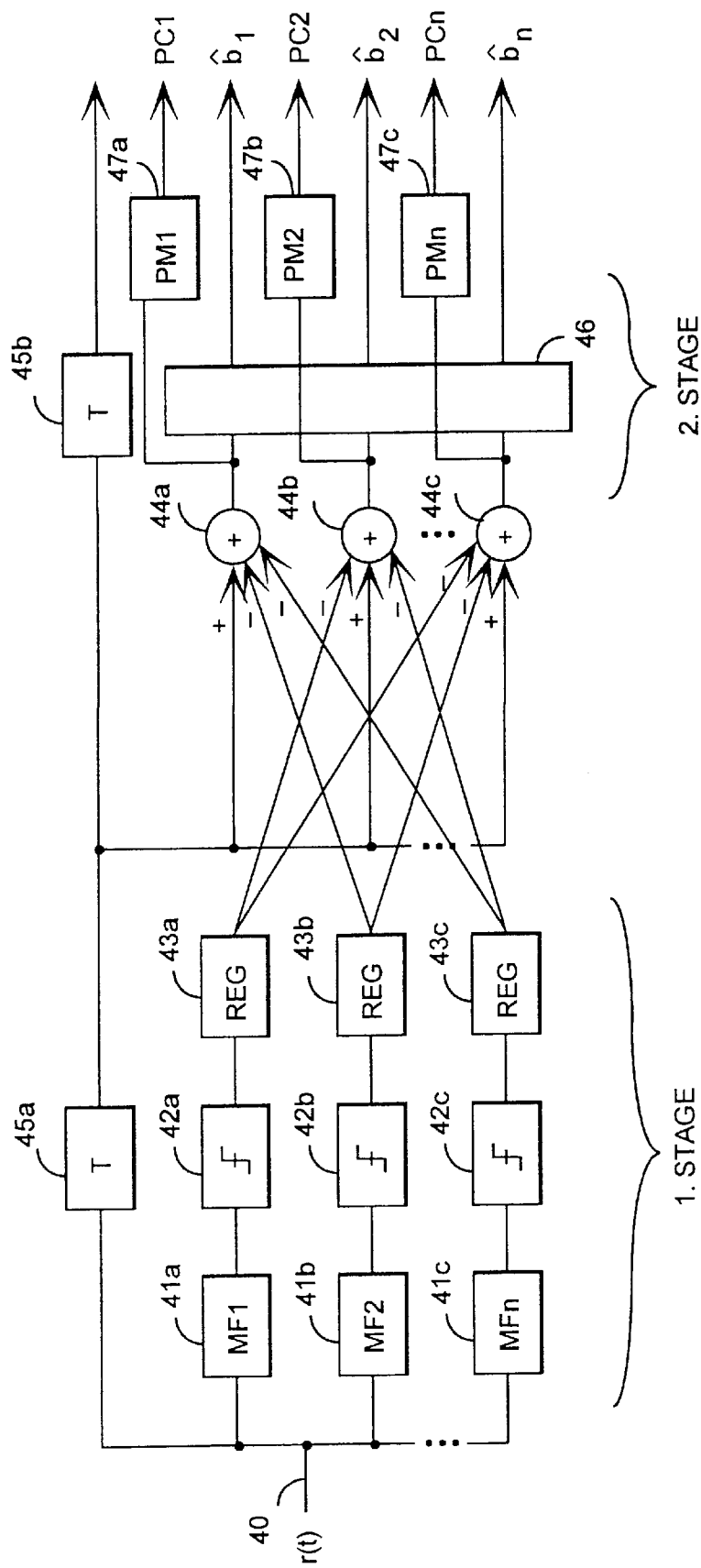

FIG. 4 illustrates the structure of the receiver of the invention in closer detail as to the essential parts for the invention, when a parallel multi-stage interference cancellation is employed in the system. The blocks in FIG. 4 correspond to blocks 23 and 24 in FIG. 2. As has been described above, in the multi-stage interference cancellation, all users received are processed in parallel, and bit estimates are adjusted iteratively by repeating the reception procedure after eliminating the interference estimates. The procedure may be repeated twice or several times, i.e. the receiver may comprise several successive stages. The estimates of the necessary power control parameters may also be adjusted iteratively, as well as the detected signal for accomplishing as reliable power control as possible.

FIG. 4 illustrates the first two stages of a multi-stage receiver, but there may be more stages. A received signal 40 is simultaneously applied to adapted filters 41a–41c, which each demodulate the signal of one user. The number of the adapted filters is thus the same as the number of current users. The output signals of the adapted filters are applied to detector means 42a–42c, where a bit decision is made for each signal. When desired, the bit decision may be made in other elements of the receiver, but it is not marked in the figure for the sake of simplicity. The detected signals are further applied to regeneration means 43a–43c, where the original transmission of each user is regenerated from the detected signal estimates. The adapted filters 41a–41c, the detector means 42a–42c and the regeneration means 43a–43c form the first stage of the receiver.

The regenerated signals are further applied as negative inputs to summing means 44a–44c, the number of which is the same as the number of the users of the system. The original received transmission 40 is applied as a positive input to each summing means 44a–44c via a first delay means 45a. In a first summing means 44a, the regenerated signals, i.e. the output signals of regeneration means 43b–43c of the other users except that of the first user are reduced from the original signal. The output signal of the first summing means 44a thus comprises a transmission which comprises the signal of the first user, and from which the interference estimate of the other users has been reduced. Accordingly, the output signals of summing means 44b and 44c only comprise the transmission of the desired user, from which transmission the interference estimates of other users have been reduced. The obtained signals are further applied to a second stage 46 of the receiver, where signals are further processed and re-detected. There may be several successive stages.

The output signals of summing means 44a–44c are also each applied to a separate measurement means 47a–47c, where the parameters required for power control are measured from each signal, and those parameters are further applied to the unit which is responsible for power control. Since the interfering effect of other signals has been eliminated from the signal from which the measurement is carried out, the obtained result is more accurate than what has been possible to achieve with prior art methods. A corresponding measurement may also be carried out from the output signals of latter stages, which provides an even more accurate result.

The power control of the invention thus takes into account the effect of the interference cancellation on the signal-to-interference ratio, on the basis of which the quality of each signal is determined, and thus leads to a desired optimal power control result when interference cancellation algorithms are employed.

When the successive interference cancellation method is employed, the power control of the invention leads to a power distribution in which the signals to be removed first are the strongest, whereas in the multi-stage interference cancellation the power distribution is even. Special features may be added to the power control of the invention if desired, such as generation of different grades of service. For example, part of the users may be set a better signal-to-interference target level the power control aims at, which naturally results in capacity loss compared with a uniform system.

In the second embodiment of the invention the measurement of the power control parameters is carried out both before and after carrying out the interference cancellation. In that case, the first measurement rapidly provides a measurement result that does not depend on the delay inevitably connected with the interference cancellation. On the basis of the measurement after the interference cancellation, a final, more accurate, result is obtained on the basis of which a more accurate adjustment may be carried out that leads to a desired quality of the user's signal.

Figure 5:
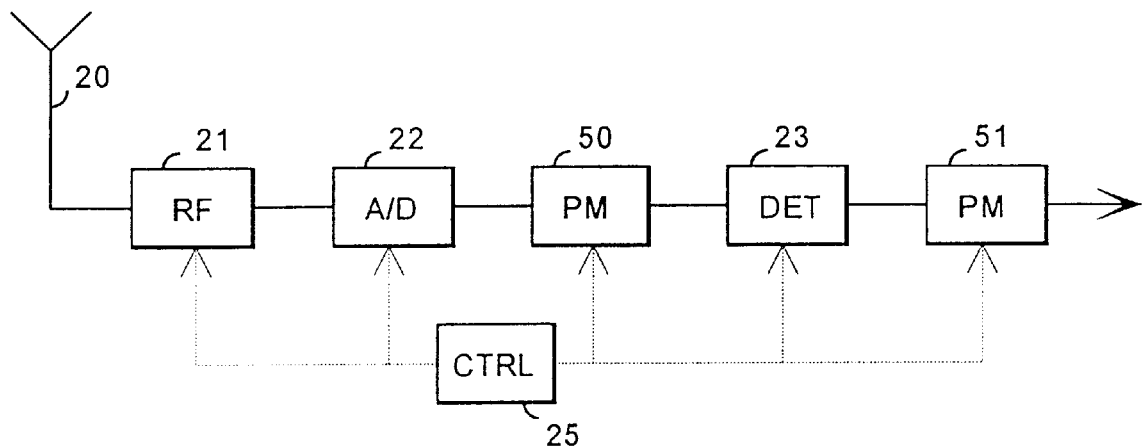

The structure of the receiver in accordance with the second embodiment of the invention is illustrated in the block diagram in FIG. 5. As in the receiver in FIG. 2, the receiver of the invention comprises an antenna 20, by means of which the received signal is applied to radio frequency elements 21. From the radio frequency elements the signal is applied via an A/D converter 22 to a first measurement means 50, where a preliminary measurement of the power control parameters is carried out. This corresponds to the measurement method employed in prior art methods. From the first measurement means 50 the signal is applied to means 23, where the interference cancellation and detection of the received signal is carried out. The receiver further comprises means 51 which carry out the measurement of the power control parameters from the received signal which has been processed with interference cancellation methods, means 51 being connected after interference cancellation and detection means 23. The signal obtained from means 51 is further applied to other elements of the receiver. The receiver further comprises control means 25 that control the operation of the above mentioned elements and calculate the actual power control commands on the basis of the parameters obtained from measurement means 50 and 51.

Although the invention has been described above with reference to the examples in accordance with the attached drawings, it is obvious that the invention is not limited thereto, but it may be modified in a variety of ways within the scope of the inventive idea set forth in the attached claims.

We claim:

1. A method for controlling transmission power in a cellular communication system, comprising the steps of:

receiving a signal by a receiver as a result of transmission by a transmitter;

subjecting the thereby received signal to interference cancellation to obtain a received signal which has been subjected to interference cancellation;

measuring parameters required for power control of the transmitter from said received signal which has been subjected to interference cancellation; and said receiver controlling transmission power of said transmitter by use of said parameters.

2. The method of claim 1, wherein:

said parameters include power of said received signal.

3. The method of claim 1, wherein:

said parameters include signal-to-interference ratio of said received signal.

4. The method of claim 1, further including:

also measuring parameters required for power control of the transmitter from said received signal before subjecting said received signal to said interference cancellation;

and said receiver controlling said transmission power of said transmitter by use not only of the respective said parameters measured from said received signal which has been subjected to interference cancellation but also of the respective said parameters measured from said received signal before said received signal has been subjected to interference cancellation.

5. A method for controlling transmission power in a cellular communication system, comprising the steps of:

receiving each of a plurality of signals by a receiver as a result of respective transmissions by a plurality of transmitters;

subjecting each thereby received signal to interference cancellation to obtain a respective received signal which has been subjected to interference cancellation;

measuring parameters required for power control of respective ones of said transmitters from respective ones of said received signals which have been subjected to interference cancellation; and said receiver controlling transmission power of respective ones of said transmitters by use of respective ones of said parameters;

said receiving comprising detecting each said received signal from a given frequency band, in decreasing magnitude of received signal power, such that prior to detection of each said received signal subsequent to one having a greatest received signal power, effects of interference of those of said received signals having stronger received signal power are eliminated from the respective said received signals.

6. A method for controlling transmission power in a cellular communication system, comprising the steps of:

receiving each of a plurality of signals by a receiver as a result of respective transmissions by a plurality of transmitters;

subjecting each thereby received signal to interference cancellation to obtain a respective received signal which has been subjected to interference cancellation;

measuring parameters required for power control of respective ones of said transmitters from respective ones of said received signals which have been subjected to interference cancellation; and said receiver controlling transmission power of respective ones of said transmitters by use of respective ones of said parameters;

said receiving comprising detecting all of said received signals in parallel, from a given frequency band.

7. The method of claim 6, comprising:

practicing said detecting in a plurality of stages; and measuring said parameters in a plurality of stages.

8. A receiver in a cellular communication system, comprising:

means for reducing multiple access interference;

means for controlling transmission power of a transmitter on the basis of reception by said receiver of a signal as a result of transmission by said transmitter; and first means for measuring parameters required for controlling transmission power of said transmitter by said receiver, said measuring means being connected in said receiver functionally after said interference cancellation means.

9. The receiver of claim 8, further comprising:

second means for measuring parameters required for power control of the transmitter from said received signal before subjecting said received signal to said interference cancellation;

said means for controlling transmission power being arranged for controlling said transmission power by use not only of the respective said parameters measured by said first means for measuring, but also the respective of said parameters measured by said second means for measuring.

10. A receiver in a cellular communication system, comprising:

means for reducing multiple access interference;

means for controlling transmission power of each of a plurality of transmitters on the basis of reception by said receiver of respective signals as a result of respective transmissions by said transmitters, to thereby provide respective receiver signals;

means for measuring parameters required for controlling transmission power of respective ones of said transmitters by said receiver, said measuring means being connected in said receiver functionally after said interference cancellation means, and detector means for detecting each said received signal from a given frequency band, in decreasing order of received signal power, such that prior to detection of each said received signal subsequent to one having a greatest received signal power, effects of interference of those at said received signals having stronger received signal power are eliminated from the respective said received signals.

11. A receiver in a cellular communication system, comprising:

means for reducing multiple access interference;

means for controlling transmission power of each of a plurality of transmitters on the basis of reception by said receiver of respective signals as a result of respective transmissions by said transmitters, to thereby provide respective receiver signals;

means for measuring parameters required for controlling transmission power of respective ones of said transmitters by said receiver, said measuring means being connected in said receiver functionally after said interference cancellation means, and detector means for detecting all of said received signals in parallel, from a given frequency band.

* * * * *